(12) United States Patent
Takada

(10) Patent No.: US 10,859,742 B2
(45) Date of Patent: Dec. 8, 2020

(54) POLARIZING PLATE AND OPTICAL DEVICE

(71) Applicant: Dexerials Corporation, Tokyo (JP)

(72) Inventor: Akio Takada, Tokyo (JP)

(73) Assignee: Dexerials Corporation, Tokyo (JP)

(*) Notice: Subject to any disclaimer, the term of this patent is extended or adjusted under 35 U.S.C. 154(b) by 171 days.

(21) Appl. No.: 16/058,338

(22) Filed: Aug. 8, 2018

(65) Prior Publication Data

US 2019/0049643 A1    Feb. 14, 2019

(30) Foreign Application Priority Data

Aug. 10, 2017  (JP) ................................ 2017-155583

(51) Int. Cl.
  *G02B 5/30*  (2006.01)
  *G02B 1/18*  (2015.01)

(52) U.S. Cl.
  CPC ............. *G02B 5/3058* (2013.01); *G02B 1/18* (2015.01)

(58) Field of Classification Search
  CPC .................................................. G02B 5/3058
  See application file for complete search history.

(56) References Cited

U.S. PATENT DOCUMENTS

| | | | | |
|---|---|---|---|---|
| 6,122,103 A * | 9/2000 | Perkins | ................ | G02B 5/3058 359/485.03 |
| 6,288,840 B1 | 9/2001 | Perkins et al. | | |
| 8,611,007 B2 * | 12/2013 | Davis | ................ | B82Y 20/00 359/485.05 |
| 9,348,076 B2 | 5/2016 | Wang et al. | | |
| 2008/0303986 A1 * | 12/2008 | Yamaki | ................ | G02B 5/3058 349/96 |

(Continued)

FOREIGN PATENT DOCUMENTS

| JP | 2003-519818 A | 6/2003 |
|---|---|---|
| JP | 2009-251544 A | 10/2009 |

(Continued)

OTHER PUBLICATIONS

Notice of Reasons for Rejection issued to JP Application No. 2017-155583, dated Oct. 10, 2017 (7 Pages).

(Continued)

*Primary Examiner* — Collin X Beatty
(74) *Attorney, Agent, or Firm* — Osha Bergman Watanabe & Burton LLP

(57) ABSTRACT

Provided is a polarizing plate having a wire grid structure, including: a transparent substrate; grid-shaped protrusions that are arranged in a one-dimensional grid shape on the transparent substrate at a pitch shorter than a wavelength of light in a use band and extend in a predetermined direction, in which the grid-shaped protrusions include a first grid-shaped protrusion group arranged, at a first pitch P1 and a second grid-shaped protrusion group arranged at a second pitch P2 between the adjacent grid-shaped protrusions of the first grid-shaped protrusion group, and in which a width W1 of the grid-shaped protrusion in the first grid-shaped protrusion group is larger than a width W2 of the grid-shaped protrusion in the second grid-shaped protrusion group. In addition, provided is an optical device including the polarizing plate.

7 Claims, 2 Drawing Sheets

(56) References Cited

U.S. PATENT DOCUMENTS

| | | | |
|---|---|---|---|
| 2011/0205457 A1* | 8/2011 | Sawaki | G02B 5/008 349/5 |
| 2012/0008205 A1* | 1/2012 | Perkins | G02B 5/3058 359/485.05 |
| 2012/0160802 A1* | 6/2012 | Kim | G02B 5/3058 216/13 |
| 2012/0319222 A1 | 12/2012 | Ozawa et al. | |
| 2013/0250411 A1* | 9/2013 | Bangerter | G02B 5/30 359/483.01 |
| 2014/0063467 A1* | 3/2014 | Takahashi | G02B 5/3058 353/20 |
| 2014/0268332 A1* | 9/2014 | Guo | G02B 5/008 359/487.01 |
| 2015/0234230 A1 | 8/2015 | Hirata et al. | |
| 2016/0146997 A1* | 5/2016 | Son | G02B 5/3058 359/485.05 |
| 2016/0170115 A1 | 6/2016 | Kim et al. | |
| 2016/0266295 A1 | 9/2016 | Cho et al. | |
| 2019/0137676 A1* | 5/2019 | Nam | C08L 83/04 |

FOREIGN PATENT DOCUMENTS

| | | | |
|---|---|---|---|
| JP | 2012-080065 A | 4/2012 | |
| WO | 2013-190681 A1 | 12/2013 | |
| WO | 2015-180975 A1 | 12/2015 | |
| WO | 2017/073044 A1 | 5/2017 | |

OTHER PUBLICATIONS

Notice of Reasons for Rejection issued to JP Application No. 2017-155583, dated Jan. 23, 2018 (4 Pages).

Notice of Reasons for Rejection issued to JP Application No. 2017-155583, dated Jun. 5, 2018 (4 Pages).

\* cited by examiner

POLARIZING PLATE AND OPTICAL DEVICE

This application is based on and claims the benefit of priority from Japanese Patent Application No. 2017-155583, filed on 10 Aug. 2017, the content of which is incorporated herein by reference.

BACKGROUND OF THE INVENTION

Field of the Invention

The present invention relates to a polarizing plate and an optical device.

Related Art

A polarizing plate is an optical element that absorbs or reflects polarized light in one direction and transmits polarized light in a direction perpendicular to the polarized light. In recent years, a wire grid type inorganic polarizing plate has begun to be adopted instead of an organic polarizing plate in an optical device such as a liquid crystal projector requiring heat resistance.

A wire grid type polarizing plate has a structure where a plurality of grid-shaped protrusions including at least a reflecting layer and extending in one direction are arranged on a transparent substrate at a pitch (several tens nanometers to several hundred nanometers) shorter than a wavelength of light in a use band. When light is incident on the polarizing plate, polarized light (TE wave (S wave)) having an electric field component parallel to the extending direction of the grid-shaped protrusion cannot be transmitted, and polarized light (TM wave (P wave)) having an electric field component perpendicular to the extending direction of the grid-shaped protrusion is transmitted as it is.

Up to now, polarizing plates having various structures have been proposed as the wire grid type polarizing plates. For example, Patent Document 1 has proposed a polarizing plate having a structure in which a large number of nano-structures including a pair of grid-shaped protrusions extending in one direction are arranged on a transparent substrate, and an interval $W_1$ between the pair of grid-shaped protrusions and an interval $W_2$ between the nano-structures are different from each other.

Incidentally, it is known that the transmittance of a polarizing plate having a wire grid structure depends on the pitch of grid-shaped protrusions. Therefore, in order to improve the transmittance of the polarizing plate, it is necessary to shorten the pitch of the grid-shaped protrusions. FIG. 3 illustrates an example of the relationship between the transmittance of the polarizing plate and the pitch of the grid-shaped protrusions. When the pitch of the grid-shaped protrusions is shortened, generally, the width of the grid-shaped protrusion also becomes small.

In addition, from the viewpoint of suppressing re-deposition when forming the grid-shaped protrusions by dry etching, it is considered preferable that the width of the grid-shaped protrusion is smaller than the width of the space between the grid-shaped protrusions. For example, in the case where the pitch of the grid-shaped protrusions is 100 nm, the width of the grid-shaped protrusion is preferably less than 50 nm.

On the other hand, since the contrast of the polarizing plate depends on the width and film thickness of the reflecting layer, in the case of shortening the width of the reflecting layer (that is, the width of the grid-shaped protrusion), there is a need to increase the film thickness of the reflecting layer.

When the pitch of the grid-shaped protrusions is shortened in this manner, the aspect ratio (=height/width) of the grid-shaped protrusion is increased, so that there is a problem that the mechanical strength (durability) of the polarizing plate is decreased.

Therefore, Patent Document 1 discloses a technique of arranging a solid filling material in a space between grid-shaped protrusions and a space between nano-structures in order to improve the mechanical strength of the polarizing plate.

Patent Document 1: U.S. Pat. No. 9,348,076

SUMMARY OF THE INVENTION

However, when the solid filling material is arranged as in Patent Document 1, the mechanical strength of the polarizing plate is improved, but the transmittance of the polarizing plate is decreased. Therefore, a technique capable of improving the mechanical strength of the polarizing plate without arranging the solid filling material is desired.

The present invention has been made in view of the above problems, and an object of the present invention is to provide a polarizing plate excellent in mechanical strength and an optical device including the polarizing plate.

(1) In order to achieve the object, the present invention provides a polarizing plate (for example, a polarizing plate 1 or 2 to be described later) having a wire grid structure, including a transparent substrate (for example, a transparent substrate 10 to be described later) and grid-shaped protrusions (for example, grid-shaped protrusions 11 to be described later) that are arranged in a one-dimensional grid shape on the transparent substrate at a pitch shorter than a wavelength of light in a use band and extend in a predetermined direction, in which the grid-shaped protrusions include a first grid-shaped protrusion group (for example, a grid-shaped protrusion group 111 to be described later) arranged at a first pitch and a second grid-shaped protrusion group (for example, a grid-shaped protrusion group 112 to be described later) arranged at a second pitch between the adjacent grid-shaped protrusions of the first grid-shaped protrusion group, and in which a width of the grid-shaped protrusion in the first grid-shaped protrusion group is larger than a width of the grid-shaped protrusion in the second grid-shaped protrusion group.

(2) In the polarizing plate of (1), the grid-shaped protrusion may include a reflecting layer, a dielectric layer, and an absorbing layer in order from the transparent substrate side.

(3) In the polarizing plate of (1), the width of the grid-shaped protrusion may be ½ or less of a wavelength of light in a use band.

(4) In the polarizing plate of any one of (1) to (3), a height of the second grid-shaped protrusion group from the transparent substrate may be smaller than a height of the first grid-shaped protrusion group from the transparent substrate.

(5) In the polarizing plate of any one of (1) to (4), the grid-shaped protrusions may further include a third grid-shaped protrusion group (for example, a grid-shaped protrusion group 113 to be described later) arranged at a third pitch between the adjacent grid-shaped protrusions of the second grid-shaped protrusion group, and the width of the grid-shaped protrusion in the second grid-shaped protrusion group may be larger than a width of the grid-shaped protrusion in the third grid-shaped protrusion group.

(6) In the polarizing plate of (5), a height of the third grid-shaped protrusion group from the transparent substrate may be smaller than a height of the second grid-shaped protrusion group from the transparent substrate.

(7) In the polarizing plate of any one of (1) to (6), a recess may be formed between the grid-shaped protrusions of the transparent substrate.

(8) In the polarizing plate of any one of (1) to (7) may further include a protective film covering the grid-shaped protrusions.

(9) In the polarizing plate of (8), the protective film may include a fluorine-based water-repellent film.

(10) In addition, the present invention provides an optical device including the polarizing plate of any one of (1) to (9).

According to the present invention, it is possible to provide a polarizing plate excellent in mechanical strength and an optical device including the polarizing plate.

DETAILED DESCRIPTION OF THE INVENTION

Hereinafter, embodiments of the present invention will be described in detail with reference to the drawings.
[Polarizing Plate]

A polarizing plate according to an embodiment is a polarizing plate having a wire grid structure and includes a transparent substrate and grid-shaped protrusions that are arranged in a one-dimensional grid shape on the transparent substrate at a pitch (period) shorter than a wavelength of light in a use band and extend in a predetermined direction. In addition, the grid-shaped protrusions include a first grid-shaped protrusion group arranged at a first pitch and a second grid-shaped protrusion group arranged at a second pitch between the adjacent grid-shaped protrusions of the first grid-shaped protrusion group, and a width of the grid-shaped protrusion in the first grid-shaped protrusion group is larger than a width of the grid-shaped protrusion in the second grid-shaped protrusion group.

Figure 1:
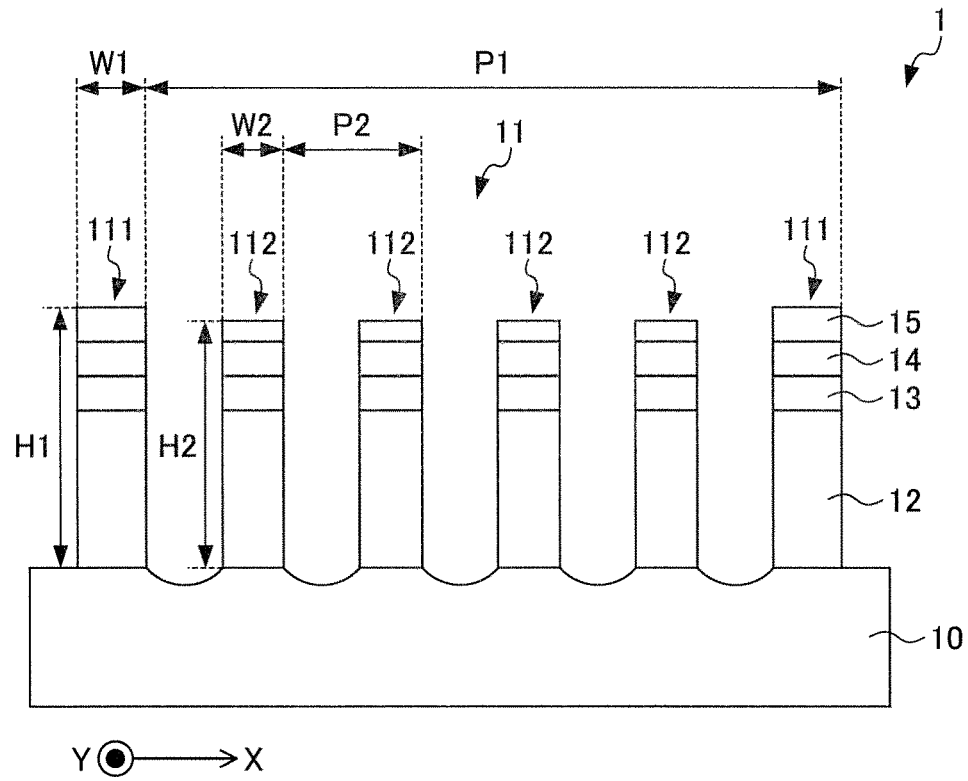
FIG. 1 is a schematic cross-sectional diagram illustrating an example of a polarizing plate according to an embodiment.

FIG. 1 is a schematic cross-sectional diagram illustrating an example of the polarizing plate according to this embodiment. As illustrated in FIG. 1, the polarizing plate 1 includes a transparent substrate 10 and grid-shaped protrusions 11 that are arranged in a one-dimensional grid shape on one surface of the transparent substrate 10 at a pitch shorter than a wavelength of light in a use band and extend in a predetermined direction. The grid-shaped protrusion 11 includes a reflecting layer 12, a dielectric layer 13, an absorbing layer 14, and a transparent layer 15 formed as necessary in order from the transparent substrate 10 side. That is, the polarizing plate 1 has a wire grid structure where the grid-shaped protrusions 11 formed by stacking the reflecting layer 12, the dielectric layer 13, the absorbing layer 14, and the transparent layer 15 in this order from the transparent substrate 10 side are arranged in a one-dimensional grid shape on the transparent substrate 10.

In this specification, as illustrated in FIG. 1, the extending direction (predetermined direction) of the grid-shaped protrusion 11 is referred to as a Y-axis direction. In addition, a direction perpendicular to the Y-axis direction and in which the grid-shaped protrusions 11 are arranged along the principal surface of the transparent substrate 10 is referred to as an X-axis direction. In this case, light incident on the polarizing plate 1 is incident, preferably, from a direction perpendicular to the X-axis direction and the Y-axis direction on the side of the transparent substrate 10 on which the grid-shaped protrusions 11 are formed.

The polarizing plate 1 utilizes the functions of absorption, interference, reflection, and the like to attenuate polarized light (TE wave (S wave)) having an electric field component parallel to the Y axis direction and to transmit polarized light (TM wave (P wave)) having an electric field component parallel to the X axis direction. Therefore, the Y axis direction is the direction of the absorption axis of the polarizing plate 1, and the X axis direction is the direction of the transmission axis of the polarizing plate 1.

Herein, in the following description, a pitch of the grid-shaped protrusions 11 denotes a repetition interval of the grid-shaped protrusions 11 in the X axis direction when the polarizing plate 1 is viewed from the Y axis direction. A width of the grid-shaped protrusion 11 denotes a dimension of the grid-shaped protrusion 11 in the X axis direction when the polarizing plate 1 is viewed from the Y axis direction.

The pitch of the grid-shaped protrusion 11 is not particularly limited as long as the pitch of the grid-shaped protrusion 11 is shorter than the wavelength of the light in the use band. Examples of the light in the use band include visible light having a wavelength of about 380 nm to 810 nm. From the viewpoint of ease and stability of fabrication, it is preferable that the pitch of the grid-shaped protrusion 11 is, for example, 100 nm to 200 nm. The pitch of the grid-shaped protrusions 11 can be measured by observation with a scanning electron microscope or a transmission electron microscope. For example, the pitches at arbitrarily selected ten positions can be measured by using a scanning electron microscope or a transmission electron microscope, and the arithmetic mean value thereof can be taken as the pitch of the grid-shaped protrusions 11. Hereinafter, this measurement method is referred to as an electron microscopy method.

The width of the grid-shaped protrusion 11 is not particularly limited, and it is preferable that the width of the grid-shaped protrusion 11 is, for example, ½ or less of the wavelength of the light in the use band. From the viewpoint of suppressing re-deposition when forming the grid-shaped protrusions 11 by dry etching, it is preferable that the width of the grid-shaped protrusions 11 is smaller than the width of the space between the grid-shaped protrusions 11. More specifically, it is preferable that the width of the grid-shaped protrusion 11 is for example, 35 nm to 45 nm. The width of the grid-shaped protrusion 11 can be measured by the above-described electron microscopy method at the center position of the height of the grid-shaped protrusion 11.

As illustrated in FIG. 1, the grid-shaped protrusions 11 includes a first grid-shaped protrusion group 111 arranged at a first pitch P1 and a second grid-shaped protrusion group 112 arranged at a second pitch P2 between the adjacent grid-shaped protrusions of first grid-shaped protrusion group 111.

In addition, in FIG. 1, the example is illustrated where four grid-shaped protrusions constituting the second grid-shaped protrusion group 112 are arranged between the adjacent grid-shaped protrusions of the first grid-shaped protrusion group 111. However, the present invention is not limited to this example. The number of the grid-shaped protrusions constituting the second grid-shaped protrusion group 112 arranged between the adjacent grid-shaped protrusions of the first grid-shaped protrusion group 111 may be two to four and may be two to eight.

The width W1 of the grid-shaped protrusions in the first grid-shaped protrusion group 111 is larger than the width W2 of the grid-shaped protrusions in the second grid-shaped protrusion group 112. The ratio between the width W1 and the width W2 is not particularly limited, and it is preferable that the ratio between the width W1 and the width W2 is, for example, W1/W2=1.1 to 1.5.

In addition, the height H2 of the second grid-shaped protrusion group 112 from the transparent substrate 10 is smaller than the height H1 of the first grid-shaped protrusion group 111 from the transparent substrate 10. The ratio between the height H2 and the height H1 is not particularly limited, and it is preferable that the ratio between the height H2 and the height H1 is, for example, H1/H2=1.1 to 1.3. In addition, the height H2 and the height H1 can be adjusted by the film thickness of the transparent layer 15 described later.

As described above, the polarizing plate 1 according to this embodiment has a structure where the grid-shaped protrusions of the second grid-shaped protrusion group 112 having a small width are interposed between the grid-shaped protrusions of the first grid-shaped protrusion group 111 having a large width. With such a structure, the polarizing plate 1 according to this embodiment is excellent in mechanical strength. In particular, since the height of the second grid-shaped protrusion group 112 is smaller than the height of the first grid-shaped protrusion group 111, the polarizing plate 1 according to this embodiment is excellent in mechanical strength in comparison with a polarizing plate where the heights of the two grid-shaped protrusion groups are equal.

In addition, since the polarizing plate 1 according to this embodiment has the structure where the grid-shaped protrusions of the second grid-shaped protrusion group 112 having a small width are interposed between the grid-shaped protrusions of the first grid-shaped protrusion group 111 having a large width, the resist pattern at the time of forming the grid-shaped protrusions 11 by dry etching as described later also has a structure where the patterns of the pattern group having a small width are interposed between the patterns of the pattern group having a large width. For this reason, according to the polarizing plate 1 of this embodiment, there is an advantage that the durability of the resist pattern at the time of forming the grid-shaped protrusions 11 is also improved.

Hereinafter, the layer configuration of the transparent substrate 10 and the grid-shaped protrusion 11 will be described in detail.

The transparent substrate 10 is not particularly limited as long as the transparent substrate 10 is a substrate exhibiting translucency with respect to the light in the use band, and the transparent substrate can be appropriately selected according to the purpose. The phrase "exhibiting translucency with respect to the light, in the use band" does not denote that the transmittance of the light in the use band is 100%, and the phrase may denote that the transparent substrate may exhibit translucency capable of retaining a function as a polarizing plate.

The shape of the principal surface of the transparent substrate 10 is not particularly limited, and a shape (for example, a rectangular shape) according to the purpose is appropriately selected. The average thickness of the transparent substrate 10 is preferably, for example, 0.3 mm to 1 mm.

As a material constituting the transparent substrate 10, a material having a refractive index of 1.1 to 2.2 is preferable, and there may be exemplified glass, quartz, sapphire, and the like. From the viewpoints of cost and light transmittance, as a material constituting the transparent substrate 10, glass is more preferable.

In addition, in the case of forming the grid-shaped protrusions 11 by dry etching as described later, in order to eliminate etching residues, over-etching which continues etching until a portion of the transparent substrate 10 is removed is required. If the over-etching amount is too small, the etching residues remain on the transparent substrate 10, and thus, there is a concern that the transmittance of the polarizing plate 1 may be decreased. On the other hand, if the over-etching amount is too large, the material of the transparent substrate 10 removed by the etching adheres to the grid-shaped protrusions 11, and thus, there is a concern that the shape of the grid-shaped protrusions 11 may be disturbed. The disturbance in the shape of the grid-shaped protrusions 11 causes scattering of light and the like, which results in deterioration of optical characteristics.

According to experiments carried out by the inventors of the present invention, in the case where the height of the grid-shaped protrusions 11 from the transparent substrate 10 is 100 nm or more, it is preferable to control the over-etching amount so that the maximum depth of the recess formed in the transparent substrate 10 is 5 nm to 30 nm. The cross-sectional shape of the recess is not particularly limited, but from the viewpoint of suppressing re-deposition, as illustrated in FIG. 1, it is preferable that the cross-sectional shape of the recess is arcuate with respect to the center of the recess.

As illustrated in FIG. 1, the grid-shaped protrusion 11 includes a reflecting layer 12, a dielectric layer 13, an absorbing layer 14, and a transparent layer 15 in order from the transparent substrate 10 side.

The reflecting layer 12 is formed on the transparent substrate 10 and arranged as a metal film extending in a band shape in the Y axis direction that is an absorption axis. The reflecting layer 12 has a function as a wire grid type polarizer to attenuate a polarized wave (TE wave (S wave)) having an electric field component in a direction parallel to the longitudinal direction of the reflecting layer 12 and transmit a polarized wave (TM wave (P wave)) having an electric field component in a direction perpendicular to the longitudinal direction of the reflecting layer 12.

The material constituting the reflecting layer 12 is not particularly limited as long as the material is reflective with respect to the light in the use band, and, for example, there may be exemplified a single-element substance such as Al, Ag, Cu, Mo, Cr, Ti, Ni, W, Fe, Si, Ge, Te or the like, or an alloy containing one or more of these elements. Among these materials, it is preferable that the reflecting layer 12 is made of Al, an Al alloy, or Ag.

The film thickness of the reflecting layer 12 is not particularly limited, and it is preferable that the film thickness of the reflecting layer 12 is, for example, 100 nm to 300 nm. In addition, the film thickness of the reflecting layer 12 can be measured by, for example, the above-described electron microscopy method.

The dielectric layer 13 is formed on the reflecting layer 12 and arranged as a dielectric film extending in a band shape in the Y axis direction that is an absorption axis. The dielectric layer 13 is formed with such a film thickness that the phase of the polarized light transmitted through the absorbing layer 14 and reflected by the reflecting layer 12 is shifted by a half wavelength from that of the polarized light reflected by the absorbing layer 14. More specifically, the film thickness of the dielectric layer 13 is appropriately set within such a range of 1 nm to 500 nm that the interference effect can be enhanced by adjusting the phase of polarized light. The film thickness of the dielectric layer 13 can be measured by, for example, the above-described electron microscopy method.

As the material constituting the dielectric layer 13, there may be exemplified general materials of a Si oxide such as $SiO_2$, a metal oxide such as $Al_2O_3$, a beryllium oxide, or a bismuth oxide, $MgF_2$, cryolite, germanium, titanium dioxide, silicon, a magnesium fluoride, a boron nitride, a boron oxide, a tantalum oxide, carbon, or a combination thereof. Among the materials, it is preferable that the dielectric layer 13 is made of a Si oxide.

It is preferable that the refractive index of the dielectric layer 13 is larger than 1.0 and is 2.5 or less. Since the optical characteristics of the reflecting layer 12 are also affected by the surrounding refractive index, the characteristics of the polarizing plate 1 can be controlled by selecting the material of the dielectric layer 13. In addition, by appropriately adjusting the film thickness and the refractive index of the dielectric layer 13, a portion of the TE wave reflected by the reflecting layer 12 at the time of being transmitted through the absorbing layer 14 can be returned back to the reflecting layer 12, and the light passing through the absorbing layer 14 can be attenuated by interference. By performing selective attenuation of the TE wave in this manner, desired polarization characteristics can be obtained.

The absorbing layer 14 is formed on the dielectric layer 13 and arranged to extend in a band shape in the Y axis direction that is an absorption axis. As a material constituting the absorbing layer 14, one or more substances (a metal material, a semiconductor material, and the like) having a light absorbing function where an extinction constant of an optical constant is not zero may be exemplified, and the material is appropriately selected depending on the wavelength range of light to be applied. As the metal material, there may be exemplified a single-element substance such as Ta, Al, Ag, Cu, Au, Mo, Cr, Ti, W, Ni, Fe, Sn or the like or an alloy containing one or more of these elements. In addition, as a semiconductor material, there may be exemplified Si, Ge, Te, ZnO, or silicide materials (β-$FeSi_2$, $MgSi_2$, $NiSi_2$, $BaSi_2$, $CrSi_2$, $CoSi_2$, $TaSi$, and the like). By using these materials, the polarizing plate 1 can have a high contrast with respect to the visible light range to be applied. Among these materials, it is preferable that the absorbing layer 14 is configured to contain Fe or Ta and contain Si.

In the case of using a semiconductor material as the absorbing layer 14, since the band gap energy of the semiconductor is involved in the absorbing function, it is necessary to use a material having a band gap corresponding to the use band. For example, in the case of using visible light having a wavelength of 400 nm or more, it is necessary to use a material having a band gap of 3.1 eV or less.

The film thickness of the absorbing layer 14 is not particularly limited, and it is preferable that the film thickness of the absorbing layer 14 is, for example, 10 nm to 100 nm. The film thickness of the absorbing layer 14 can be measured by, for example, the above-described electron microscopy method.

The transparent layer 15 is formed on the absorbing layer 14 and arranged to extend in a band shape in the Y axis direction that is an absorption axis. The material constituting the transparent layer 15 is not particularly limited as long as the material is translucent with respect to light in the use band, and among these materials, a Si oxide such as $SiO_2$ is preferable.

The film thickness of the transparent layer 15 is not particularly limited, and it is preferable that the film thickness of the transparent layer 15 is, for example, 5 nm to 30 nm. The film thickness of the transparent layer 15 can be measured by, for example, the above-described electron microscopy method.

The polarizing plate 1 according to this embodiment may further include a protective film covering the grid-shaped protrusions 11 as long as the optical characteristics are not impaired. As the protective film, a film made of a dielectric material may be exemplified, and it is particularly preferable to include a fluorine-based water-repellent film formed by coating a fluorine-based silane compound such as perfluorodecyltriethoxysilane (FDTS). The protective film includes the fluorine-based water-repellent film, so that reliability such as moisture resistance of the polarizing plate 1 can be improved. In addition, the protective film can be formed by using a chemical vapor deposition method (CVD method), an atomic layer deposition method (ALD method), or the like.

[Method of Manufacturing Polarizing Plate]

A method of manufacturing the polarizing plate 1 according to this embodiment includes a laminate forming process, a resist pattern forming process, and an etching process.

First, in the laminate forming process, a laminate having a reflecting layer, a dielectric layer, an absorbing layer, and a transparent layer in this order from a transparent substrate 10 side is formed on the transparent substrate 10. As a method of forming each of these layers, there may be exemplified a sputtering method, a vapor deposition method, or the like.

Next, in the resist pattern forming process, resist patterns corresponding to the first grid-shaped protrusion group 111 and the second grid-shaped protrusion group 112 are formed on the laminate. A method of forming the resist pattern is not particularly limited, and an arbitrary method may be adopted.

For example, the resist pattern corresponding to the first grid-shaped protrusion group 111 and the resist pattern corresponding to the second grid-shaped protrusion group 112 may be simultaneously formed by a photolithography method or a nanoimprinting method. In addition, after the resist pattern corresponding to the first grid-shaped protrusion group 111 is formed by a photolithography method or a nanoimprinting method, the resist pattern corresponding to the second grid-shaped protrusion group 112 may be formed by a photolithography method.

Alternatively, the resist pattern may be formed by using microphase separation of a block copolymer. The block copolymer is not particularly limited as long as the block copolymer is capable of forming a lamellar structure by microphase separation, and there may be exemplified, for example, a block copolymer (PS-b-PMMA) of polystyrene (PS) and polymethyl methacrylate (PMMA). After the resist pattern corresponding to the first grid-shaped protrusion group 111 is formed by photolithography method or nanoimprinting method, the PS-b-PMMA is coated on the space between the patterns, and heat treatment (annealing) is performed, so that the PS-b-PMMA is aligned in a grid shape. After that, the PMMA is selectively etched by using oxygen plasma, so that a PS pattern can be formed. In addition, the pitch of the PS pattern can be adjusted by a copolymerization ratio and a molecular weight of the PS-b-PMMA.

Next, in the etching process, the laminate is selectively etched by using the formed resist pattern as a mask, so that the grid-shaped protrusions 11 are formed. As an etching method, for example, a dry etching method using an etching gas corresponding to an etching target may be exemplified.

In addition, the method of manufacturing the polarizing plate 1 according to this embodiment may further include a protective film forming process of forming a protective film covering the grid-shaped protrusions 11. The protective film can be formed by using a CVD method, an ALD method, or the like.

[Optical Device]

An optical device according to this embodiment includes the polarizing plate according to the above-described embodiment. As the optical device, there may be exemplified a liquid crystal projector, a head-up display, a digital camera, and the like. Since the polarizing plate according to this embodiment is an inorganic polarizing plate which is excellent in heat resistance in comparison with an organic polarizing plate, the polarizing plate according to this embodiment is suitable for applications such as a liquid crystal projector, a head up display, and the like which are required to have heat resistance.

In the case where the optical device according to this embodiment includes a plurality of polarizing plates, at least one of the plurality of polarizing plates may be a polarizing plate according to this embodiment. For example, in the case where the optical device according to this embodiment is a liquid crystal projector, at least one of the polarizing plates arranged on the incident side and the emitting side of the liquid crystal panel may be the polarizing plate according to this embodiment.

Modified Example

In addition, the present invention is not limited to the above-described embodiments, but variations and modifications within the scope where the object of the present invention can be achieved are included in the present invention.

Figure 2:
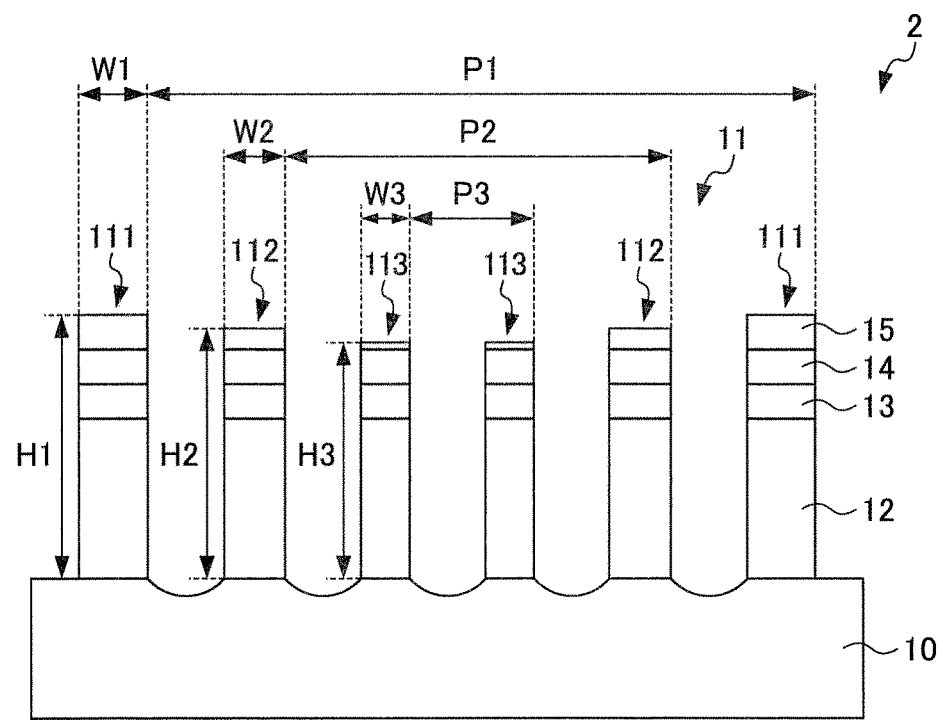
FIG. 2 is a schematic cross-sectional diagram illustrating an example of a polarizing plate according to Modified Example of the embodiment.
Figure 3:
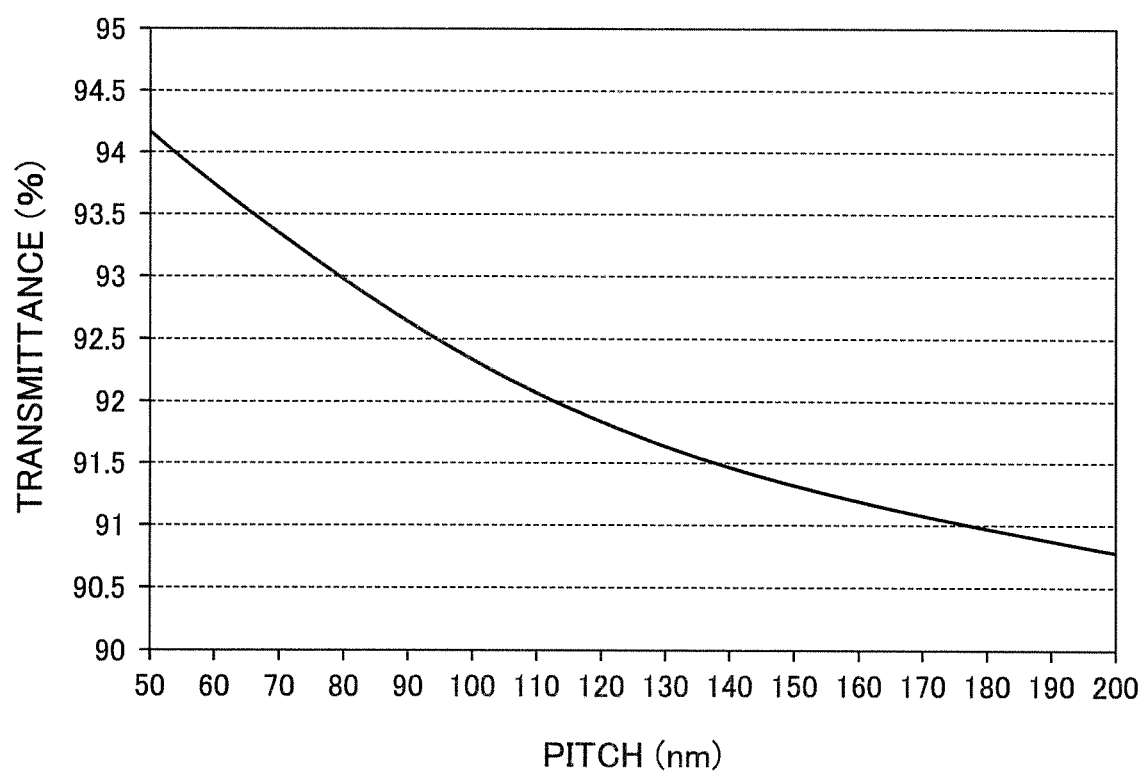
FIG. 3 is a diagram illustrating an example of a relationship between transmittance of a polarizing plate and a pitch of grid-shaped protrusions.

FIG. 2 is a schematic cross-sectional diagram illustrating an example of a polarizing plate according to Modified Example of this embodiment. In FIG. 2, the same components as those of the polarizing plate 1 illustrated in FIG. 1 are denoted by the same reference numerals, and detailed description thereof will be omitted.

In the polarizing plate 2 illustrated in FIG. 2, the grid-shaped protrusions 11 includes a first grid-shaped protrusion group 111 arranged at a first pitch P1, a second grid-shaped protrusion group 112 arranged at a second pitch P2 between the adjacent grid-shaped protrusions of the first grid-shaped protrusion group 111, and a third grid-shaped protrusion group 113 arranged at a third pitch P3 between the adjacent grid-shaped protrusions of the second grid-shaped protrusion group 112.

The width W2 of the grid-shaped protrusion in the second grid-shaped protrusion group 112 is larger than the width W3 of the grid-shaped protrusion in the third grid-shaped protrusion group 113. The ratio between the width W2 and the width W3 is not particularly limited, and for example, W2/W3=1.1 to 1.5 is preferable.

The height H3 of the third grid-shaped protrusion group 113 from the transparent substrate 10 is smaller than the height H2 of the second grid-shaped protrusion group 112 from the transparent substrate 10. The ratio between the height H3 and the height H2 is not particularly limited, and for example, H2/H3=1.1 to 1.3 is preferable. In addition, the height H3 can be adjusted by the film thickness of the transparent layer 15.

In the polarizing plate 2 according to Modified Example of this embodiment has a structure where the grid-shaped protrusions of the third grid-shaped protrusion group 113 having the smallest width are interposed between the grid-shaped protrusions of the second grid-shaped protrusion group 112 having a larger width and the grid-shaped protrusions of the second grid-shaped protrusion group 112 are interposed between the grid-shaped protrusions of the first grid-shaped protrusion group 111 having the largest width. With such a structure, the polarizing plate 2 is excellent in mechanical strength. In particular, since the height of the third grid-shaped protrusion group 113 is smaller than the height of the second grid-shaped protrusion group 112 and the height of the second grid-shaped protrusion group 112 is smaller than the height of the first grid-shaped protrusion group 111, the polarizing plate 2 is excellent in mechanical strength in comparison with a polarizing plate where the heights of the three grid-shaped protrusion groups are equal.

In addition, in FIGS. 1 and 2, the present invention is applied to an absorption type polarizing plate that absorbs TE waves (S waves). However, the present invention may be applied to a reflection type polarizing plate that reflects TE waves (S waves).

EXPLANATION OF REFERENCE NUMERALS 1, 2 polarizing plate
10 transparent substrate
11 grid-shaped protrusion
12 reflecting layer
13 dielectric layer
14 absorbing layer
15 transparent layer
111 first grid-shaped protrusion group
112 second grid-shaped protrusion group
113 third grid-shaped protrusion group

What is claimed is:

1. A polarizing plate having a wire grid structure, comprising:
   a transparent substrate; and
   grid-shaped protrusions that are arranged in a one-dimensional grid shape on the transparent substrate at a pitch shorter than a wavelength of light in a use band and extend in a predetermined direction,
   wherein the pitch of the grid-shaped protrusions is from 100 nm to 200 nm,
   wherein the grid-shaped protrusions include a first grid-shaped protrusion group arranged at a first pitch and a second grid-shaped protrusion group arranged at a second pitch between the adjacent grid-shaped protrusions of the first grid-shaped protrusion group,
   wherein a first width of the grid-shaped protrusion in the first grid-shaped protrusion group is larger than a second width of the grid-shaped protrusion in the second grid-shaped protrusion group,
   wherein the grid-shaped protrusions includes a reflecting layer, a dielectric layer, and an absorbing layer in order from the transparent substrate side, and
   wherein a height of the second grid-shaped protrusion group from the transparent substrate is smaller than a height of the first grid-shaped protrusion group from the transparent substrate, wherein the first pitch and the second pitch correspond to repetition intervals of the grid-shaped protrusions in an axis direction, and wherein the first width and the second width correspond to a predetermined dimension of the grid-shaped protrusions in the axis direction.

2. The polarizing plate according to claim 1, wherein the width of the grid-shaped protrusions is ½ or less of a wavelength of light in a use band.

3. The polarizing plate according to claim 1, wherein the grid-shaped protrusions further include a third grid-shaped protrusion group arranged at a third pitch between the adjacent grid-shaped protrusions of the second grid-shaped protrusion group, wherein the width of the grid-shaped protrusion in the second grid-shaped protrusion group is larger than a width of the grid-shaped protrusion in the third grid-shaped protrusion group, and wherein a height of the third grid-shaped protrusion group from the transparent substrate is smaller than a height of the second grid-shaped protrusion group from the transparent substrate.

4. The polarizing plate according to claim 1, wherein a recess is formed between the grid-shaped protrusions of the transparent substrate.

5. The polarizing plate according to claim 1, further comprising a protective film covering the grid-shaped protrusions.

6. The polarizing plate according to claim 5, wherein the protective film includes a fluorine-based water-repellent film.

7. An optical device comprising the polarizing plate according to claim 1.

* * * * *